(12) United States Patent
Hammer et al.

(10) Patent No.: US 11,247,523 B2
(45) Date of Patent: Feb. 15, 2022

(54) SYSTEMS AND METHODS FOR CONTROLLING WHEEL MOTION DURING A COLLISION

(71) Applicant: TOYOTA MOTOR ENGINEERING & MANUFACTURING NORTH AMERICA, INC., Plano, TX (US)

(72) Inventors: Jeremiah T. Hammer, Ann Arbor, MI (US); John P. Kim, Ann Arbor, MI (US); Mark Clauser, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 163 days.

(21) Appl. No.: 16/680,228

(22) Filed: Nov. 11, 2019

(65) Prior Publication Data
US 2021/0138858 A1    May 13, 2021

(51) Int. Cl.
| | |
|---|---|
| *B60G 3/04* | (2006.01) |
| *B60G 3/20* | (2006.01) |
| *B62D 9/00* | (2006.01) |
| *B60B 30/06* | (2006.01) |

(52) U.S. Cl.
CPC ............. *B60G 3/20* (2013.01); *B60B 30/06* (2013.01); *B62D 9/00* (2013.01); *B60G 2206/016* (2013.01)

(58) Field of Classification Search
CPC .... B60G 3/20; B60G 2206/016; B60B 30/06; B62D 9/00
See application file for complete search history.

(56) References Cited

U.S. PATENT DOCUMENTS

| | | | |
|---|---|---|---|
| 7,819,218 B2 | 10/2010 | Eichberger et al. | |
| 9,120,507 B1 * | 9/2015 | Alwan | ................. B60R 19/34 |
| 9,327,763 B2 | 5/2016 | Maier | |
| 9,522,584 B2 | 12/2016 | Jensen et al. | |
| 10,059,288 B2 * | 8/2018 | Canobbio | ............ B62D 21/152 |
| 2013/0328334 A1 * | 12/2013 | Hoiss | .................... B60R 19/24 |
| | | | 293/154 |
| 2015/0000995 A1 * | 1/2015 | Konchan | ................ B60R 19/26 |
| | | | 180/280 |
| 2015/0084322 A1 | 3/2015 | Killian et al. | |

(Continued)

FOREIGN PATENT DOCUMENTS

GB    2373561 A    9/2002

*Primary Examiner* — Toan C To
(74) *Attorney, Agent, or Firm* — Haynes and Boone, LLP

(57) ABSTRACT

Systems and methods for controlling wheel motion during a collision are provided. A retaining member may be connectable between a vehicle frame and a wheel assembly to control motion of the wheel assembly during a collision of a vehicle with an object. The retaining member may include one or more of a first attachment point connecting the retaining member to the vehicle frame, a second attachment point connecting the retaining member to the wheel assembly, a retaining member routing, and/or one or more break-away connections attaching the retaining member to the vehicle frame and/or to the wheel assembly. The first and second attachment points, retaining member routing, and/or break-away connections may be selected to control motion of the wheel assembly within a preferred path to control loading between the object and the vehicle.

20 Claims, 6 Drawing Sheets

(56) References Cited

U.S. PATENT DOCUMENTS

| | | | |
|---|---|---|---|
| 2015/0166115 A1* | 6/2015 | Kim | B60G 7/001 280/124.134 |
| 2017/0015380 A1* | 1/2017 | Stothers | B62K 15/00 |
| 2020/0130444 A1* | 4/2020 | White | B60G 7/02 |

* cited by examiner

SYSTEMS AND METHODS FOR CONTROLLING WHEEL MOTION DURING A COLLISION

TECHNICAL FIELD

The present disclosure relates generally to vehicle safety features, and, more particularly, to systems and methods for controlling wheel motion during a collision.

BACKGROUND

During a small overlap frontal crash mode, a vehicle strikes a rigid barrier at 25% or less overlap to the vehicle width. Due to this small overlap between the barrier and the vehicle, the main structural and energy absorbing members are not directly contacted, which may cause severe deformation to the vehicle cabin. Loading between the barrier and the wheel generally leads to chassis part fracture and a separation of the tire from the vehicle. Due to the complex nature of part fracture and dynamics of the wheel, it can be difficult to accurately control motion of the wheel after separation from the vehicle. Typically, wheel motion during a collision is not repeatable and a small change in motion can drastically change the results of a test.

Therefore, a need exists in the art of systems and methods to control wheel motion during a collision that addresses the above deficiencies, or at least offers an improvement, in the art. For example, a need exists for systems and methods for controlling motion of the wheel and/or using the wheel to push the vehicle off the barrier during a collision.

BRIEF SUMMARY

The present disclosure provides systems and methods for controlling wheel motion during collision of a vehicle with an object, such as a barrier, roadside object, other vehicle, or the like. For example, systems and methods are provided that force or otherwise direct a tire or wheel into a preferred path to control loading between the object and the vehicle, such as between the object and the tire or wheel. The systems and methods may force or otherwise direct a tire or wheel into a position that utilizes the tire or wheel as a load path to push the vehicle away from the object. Additionally, or alternatively, at least portions of the systems themselves may define a load path tending to rotate the vehicle about the object during a collision.

Various embodiments of the present disclosure include a system for controlling wheel motion during a collision. The system may include a retaining member connectable between a vehicle fame and a wheel assembly to control motion of the wheel assembly during a collision of a vehicle with an object. The retaining member may include a first attachment point for connecting the retaining member to the vehicle frame, a second attachment point for connecting the retaining member to the wheel assembly, and one or more break-away connections for attaching the retaining member to the vehicle frame and/or to the wheel assembly. The first attachment point may be selected to control motion of the wheel assembly during the collision by controlling an arc motion of the wheel assembly towards the vehicle frame. The second attachment point may be selected to control motion of the wheel assembly during the collision by controlling a rotation of the wheel assembly towards the vehicle frame. The one or more break-away connections may be selected to control motion of the wheel assembly during the collision by modifying the arc motion of the wheel assembly towards the vehicle frame.

Various embodiments of the present disclosure include a system for controlling wheel motion during a collision. The system may include a vehicle frame, a wheel assembly, and a retaining member connected between the vehicle frame and the wheel assembly to control motion of the wheel during a collision with an object. The retaining member may include a first attachment point connecting the retaining member to the vehicle frame, a second attachment point connecting the retaining member to the wheel assembly, and one or more break-away connections attaching the retaining member to the vehicle frame and/or to the wheel assembly. The first attachment point may be selected to control motion of the wheel assembly during the collision by controlling an arc motion of the wheel assembly towards the vehicle frame. The second attachment point may be selected to control motion of the wheel assembly during the collision by controlling a rotation of the wheel assembly towards the vehicle frame. The one or more break-away connections may be selected to control motion of the wheel assembly during the collision by modifying the arc motion of the wheel assembly towards the vehicle frame.

Various embodiments of the present disclosure include a method for controlling wheel motion during a collision. The method may include providing a retaining member for connection between a vehicle frame and a wheel assembly to control motion of the wheel assembly during a collision of a vehicle with an object, and tuning motion of the wheel assembly in response to impact with the object by controlling one or more parameters of the retaining member. Tuning motion of the wheel assembly may include selecting a first attachment point connecting the retaining member to the vehicle frame to control an arc motion of the wheel assembly towards the vehicle frame, selecting a second attachment point connecting the retaining member to the wheel assembly to control a rotation of the wheel assembly towards the vehicle frame, and selecting one or more break-away connections attaching the retaining member to the vehicle frame and/or to the wheel assembly to modify the arc motion of the wheel assembly towards the vehicle frame.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Aspects of the present disclosure are best understood from the following detailed description when read with the accompanying figures.

DETAILED DESCRIPTION

The present disclosure provides systems and methods for controlling motion of a tire and wheel assembly during a collision. A retaining member may be connectable between a vehicle frame and a wheel assembly to control motion of the wheel assembly during a collision of a vehicle with an object. The retaining member may include one or more of a first attachment point connecting the retaining member to the vehicle frame, a second attachment point connecting the retaining member to the wheel assembly, a retaining member length, a retaining member routing, and one or more break-away connections attaching the retaining member to the vehicle frame and/or to the wheel assembly. The first and second attachment points, retaining member length, retaining member routing, and break-away connections may be selected to control motion of the wheel assembly within a preferred path to control loading between the object and the vehicle.

Figure 1:
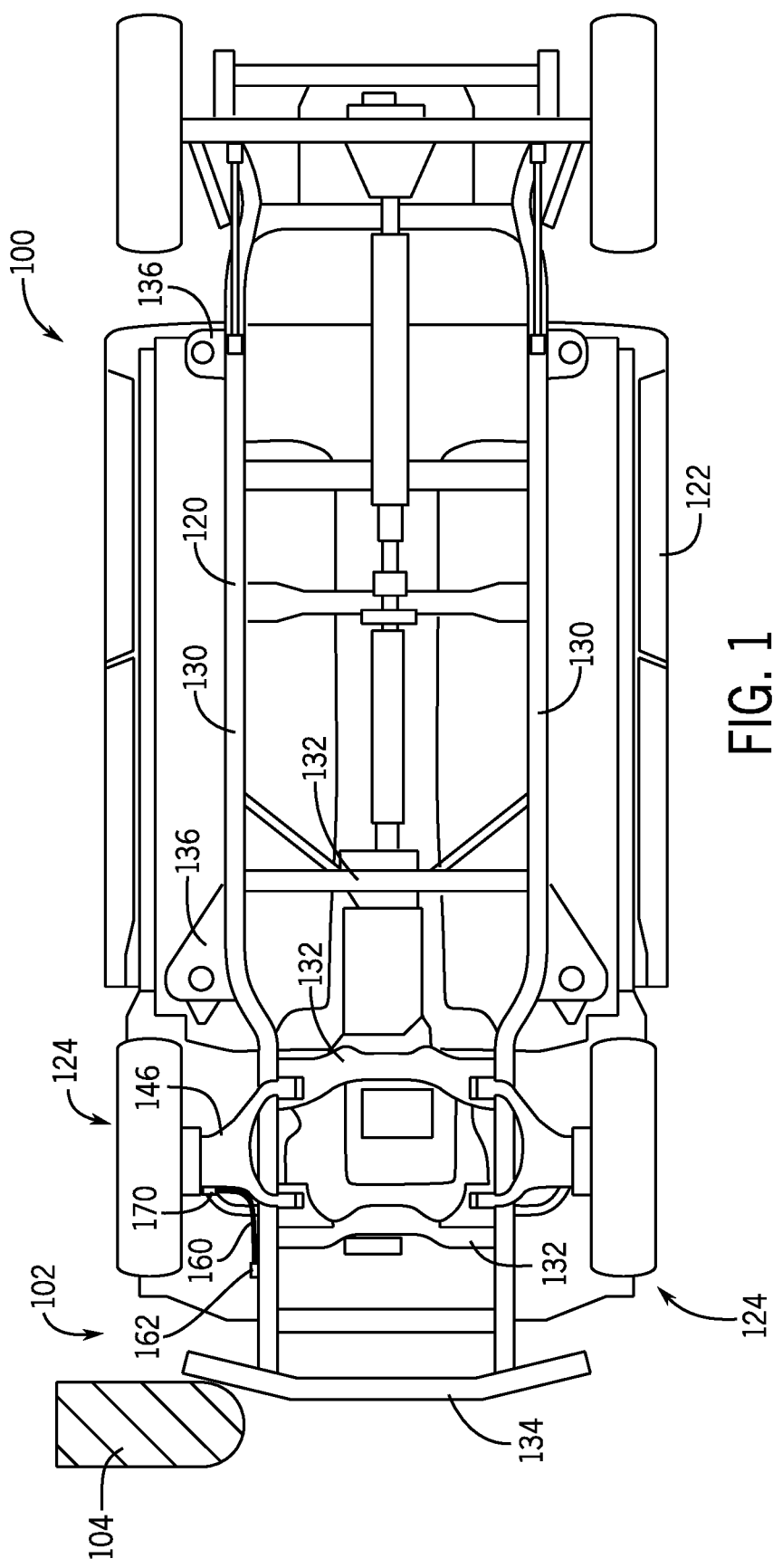
FIG. 1 is a bottom view of a vehicle including a system for controlling wheel motion during collision of the vehicle with an object, according to one or more embodiments of the present disclosure.

FIG. 1 is a bottom view of a vehicle 100 including a system 102 for controlling wheel motion during collision of the vehicle 100 with an object 104, according to one or more embodiments of the present disclosure. For example, when the front of a vehicle 100 strikes an object 104 at a location offset from the longitudinal centerline of the vehicle 100, the object 104 may not contact the main structural or energy absorbing members of the vehicle 100. Rather, the object 104 may primarily contact the corner of the vehicle 100, including the tire or wheel at the corner, which may lead to severe deformation of the vehicle 100, including dangerous deformation of the vehicle's cabin or occupant area, as collision forces are directed toward the outer edges of the vehicle 100. This is especially true in situations simulated by small overlap collisions in which 25% or less of the width of the vehicle 100 overlaps the impinging object 104 or structure. The object 104 may be any movable or immovable object or structure with sufficient mass, strength, and/or rigidity to deform the vehicle 100 during a collision, including a barrier, roadside object, other vehicle, or the like.

As described herein, the system 102 controls how a tire or wheel moves following collision with the object 104 to improve collision safety. For example, the system 102 is configured to force or otherwise direct a tire or wheel into a preferred path to control loading between the object 104 and the vehicle 100, such as between the object 104 and the vehicle's frame. In some embodiments, the system 102 may maximize lateral motion of the vehicle 100 away from the object 104 to limit impingement of the object 104 into sensitive areas of the vehicle 100, such as the cabin or occupant area. For example, the system 102 may force or otherwise direct a tire or wheel into a position that utilizes the tire or wheel as a load path to push the vehicle 100 away from the object 104. Additionally, or alternatively, at least a portion of the system 102 itself may define a load path tending to rotate the vehicle 100 about the object 104 during a collision. In some embodiments, the system 102 may limit ejection of the tire or wheel from the vehicle 100, all of which are described more fully below.

As shown in FIG. 1, the vehicle 100 includes a vehicle frame 120, a cabin 122, and a pair of front wheel assemblies 124. The vehicle frame 120 includes a pair of structural members 130 running a length of the vehicle 100 between the front and rear of the vehicle 100, and a plurality of cross members 132 or cradles extending between the pair of structural members 130. The vehicle frame 120 also includes a front bumper 134 connected to terminal ends of the structural members 130 adjacent to the front of the vehicle 100. In some embodiments, the vehicle frame 120 may include one or more outriggers 136 extending from the structural members 130 towards the sides of the vehicle 100 for attachment of the cabin 122 with the vehicle frame 120, among other uses.

The cabin 122 is connected to the vehicle frame 120 and defines an occupant area or space of the vehicle 100. For example, the cabin 122 may be connected to the outriggers 136 of the vehicle frame 120 between the front and rear wheel assemblies. The cabin 122 may be arranged or configured to house the occupant(s) (e.g., driver and/or passenger(s)) of the vehicle 100) and protect the occupant(s) from outside elements.

Each front wheel assembly 124 may include a wheel and one or more associated components connecting the wheel to the vehicle frame 120. For example, each front wheel assembly 124 may include a steering knuckle 142 that is attached to the vehicle frame 120 via one or more steering and/or suspension components. Depending on the application, the vehicle 100 may include a double wishbone suspension, in which case the steering knuckle 142 may be attached to the vehicle frame 120 via an upper control arm 144 and a lower control arm 146. For example, the steering knuckle 142 may be connected to and between outboard ends of the upper control arm 144 and the lower control arm 146. As shown in FIG. 1, the lower control arms 146 may be attached to the vehicle frame 120, such as to the structural members 130 and/or to one or more cross members 132. As described herein, "wheel" refers to a wheel rim, a tire, and/or the wheel rim and tire combination.

As described herein, the system 102 controls motion of a front wheel assembly 124 during a collision. For instance, the system 102 includes one or more retaining members 160 connected between the vehicle frame 120 and each front wheel assembly 124 to control motion of the front wheel assembly 124 during a collision of the vehicle 100 with the object 104. In one or more embodiments, the retaining member 160 may be connected to and between the vehicle frame 120 and the steering knuckle 142 of the front wheel assembly 124. The retaining member 160 may be routed between the vehicle frame 120 and the steering knuckle 142 along either the lower control arm 146 (see FIGS. 2-4) or the upper control arm 144 (see FIG. 5).

The retaining member 160 may include many configurations. Depending on the application, the retaining member 160 may be a tether or a cable with material properties permitting operation of the retaining member 160 described herein. For example, the retaining member 160 may include a retaining member length between 400 mm and 600 mm, though other lengths are contemplated depending on the application. The retaining member 160 may include a strength between 40 kN and 150 kN, though other strengths are contemplated depending on the application. In some embodiments, the retaining member 160 may be flexible, such as resiliently flexible. For instance, the retaining member 160 may be similar to heavy duty Kevlar rope or steel braided cable.

Figure 2:
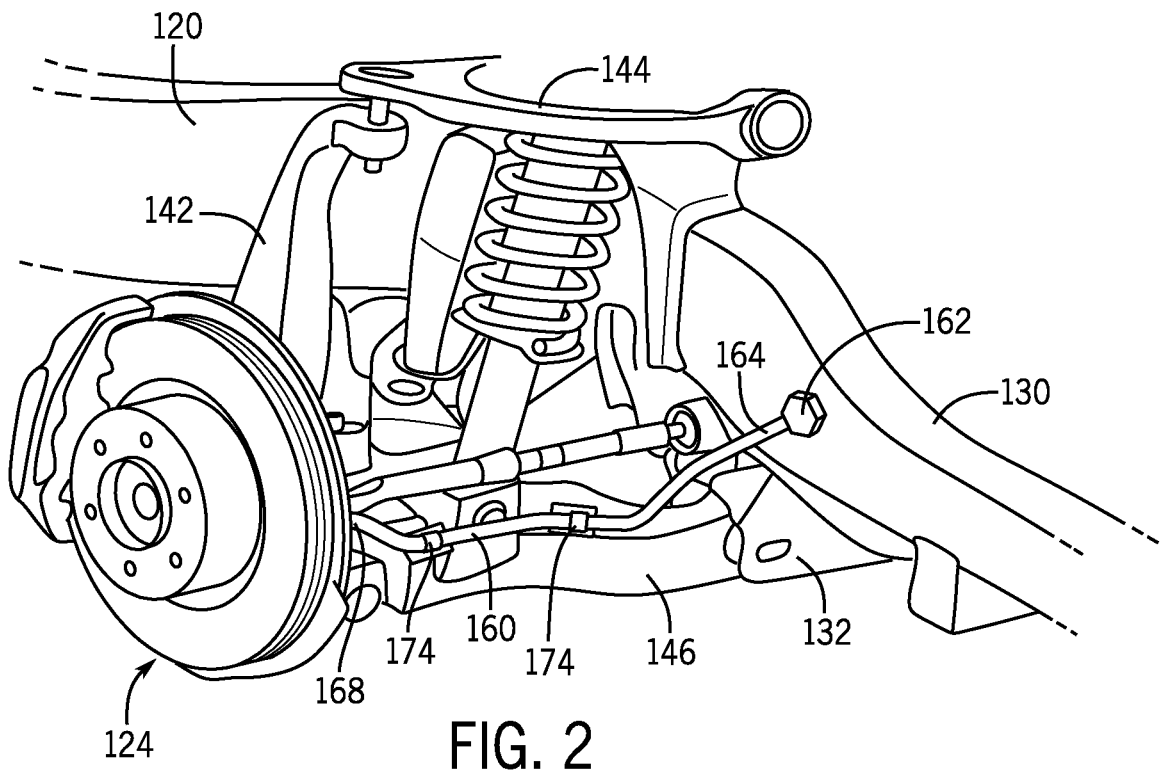
FIG. 2 is a fragmentary perspective view of the vehicle of FIG. 1 and showing the system attached to the vehicle's frame at a first location, according to one or more embodiments of the present disclosure.
Figure 3:
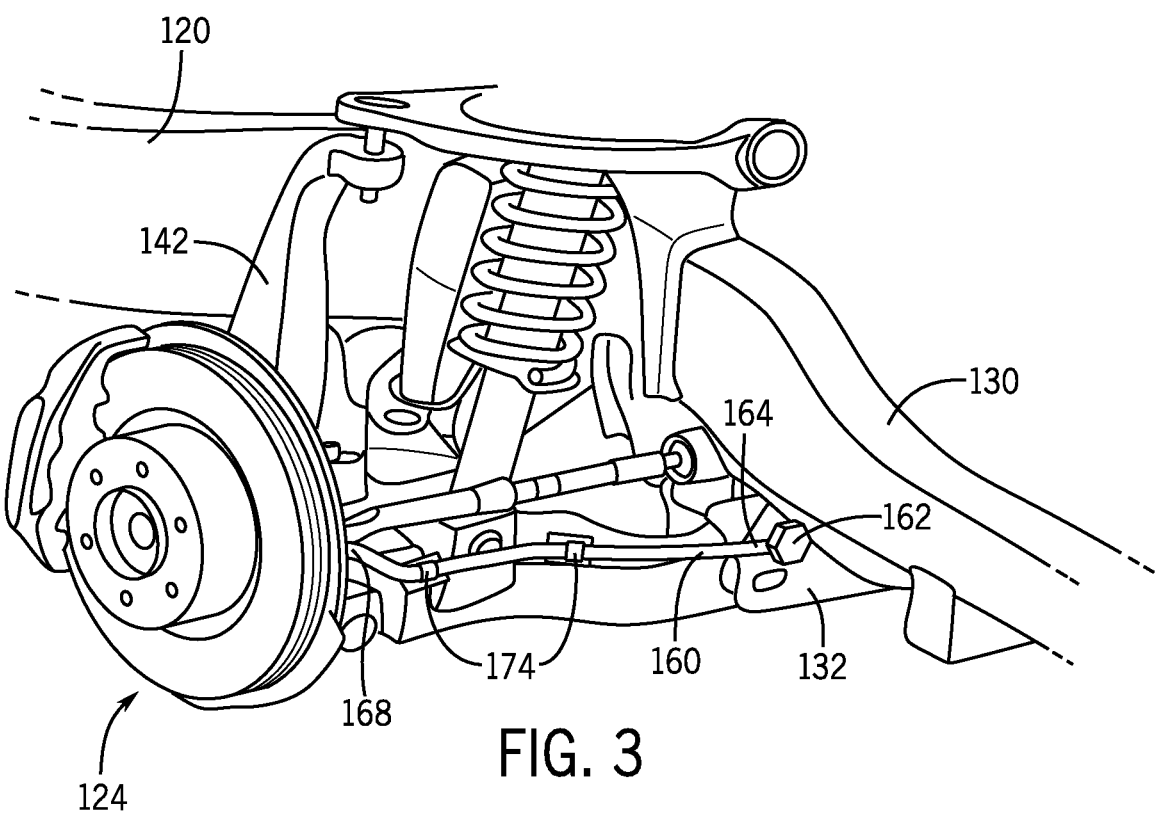
FIG. 3 is a fragmentary perspective view of the vehicle of FIG. 1 and showing the system attached to the vehicle frame at a second location, according to one or more embodiments of the present disclosure.

FIG. 2 is a fragmentary perspective view of the vehicle 100 and showing the retaining member 160 attached to the vehicle frame 120 at a first location, according to one or more embodiments of the present disclosure. FIG. 3 is a fragmentary perspective view of the vehicle 100 and showing the retaining member 160 attached to the vehicle frame 120 at a second location, according to one or more embodiments of the present disclosure. As shown in FIGS. 2 and 3, the retaining member 160 may include a first attachment point 162 connecting the retaining member 160 to the vehicle frame 120. The retaining member 160 may include a first end 164 and a second end 168. The first end 164 of the retaining member 160 may be connected to the vehicle frame 120 with a first connection, such as at the first attachment point 162.

The first attachment point 162 may connect the retaining member 160 to the vehicle frame 120 at a position between the front wheel assembly 124 and the front of the vehicle 100. For instance, the first attachment point 162 may connect the retaining member 160 to the vehicle frame 120 forward of the steering knuckle 142, adjacent to the front bumper 134, or the like. Depending on the application, the retaining member 160 may be connected to the vehicle frame 120 at the first attachment point 162 via a bolted connection, a loop and grommet type connection, or the like.

The first attachment point 162 may be selected to control motion of the wheel assembly during a collision. For example, FIG. 2 illustrates the first attachment point 162 at the structural member 130 of the vehicle frame 120. FIG. 3 illustrates the first attachment point 162 at one of the cross members 132 of the vehicle frame 120, such as at an engine cradle. The first attachment point 162 may be selected to control an arc motion of the front wheel assembly 124 during a collision. For instance, changing the placement of the first attachment point 162 may allow for different arcs of travel of the front wheel assembly 124 during a collision. In this manner, the first attachment point 162 may be selected to control the angle of the front wheel assembly 124 and/or contact position of the front wheel assembly 124 with the vehicle frame 120 during a collision.

For example, using a longer retaining member 160 may cause a longer arc motion of the front wheel assembly 124, whereas using a shorter retaining member 160 may cause a smaller arc motion of the front wheel assembly 124. In embodiments where a longer arc motion of the front wheel assembly 124 is desired, the first attachment point 162 may be selected to allow for a longer retaining member 160. In embodiments where a shorter arc motion of the front wheel assembly 124 is desired, the first attachment point 162 may be selected to allow for a shorter retaining member 160. Depending on the desired arc motion of the front wheel assembly 124 and/or length of the retaining member 160, the first attachment point 162 may be selected to increase or decrease the distance between the first attachment point 162 and the front wheel assembly 124. For instance, selecting the first attachment point 162 at the structural member 130 of the vehicle frame 120, such as that illustrated in FIG. 2, may accommodate a longer retaining member 160 for a longer arc motion of the front wheel assembly 124. Selecting the first attachment point 162 at the engine cradle of the vehicle frame 120, such as that illustrated in FIG. 3, may accommodate a shorter retaining member 160 for a shorter arc motion of the front wheel assembly 124. Selecting the first attachment point 162 may primarily affect the rotation of the front wheel assembly 124 in the Z or top rotational direction of the vehicle 100. However, selecting the first attachment point 162 may also affect movement and/or rotation of the front wheel assembly 124 in the X or Y directions of the vehicle 100 as well.

Figure 4:
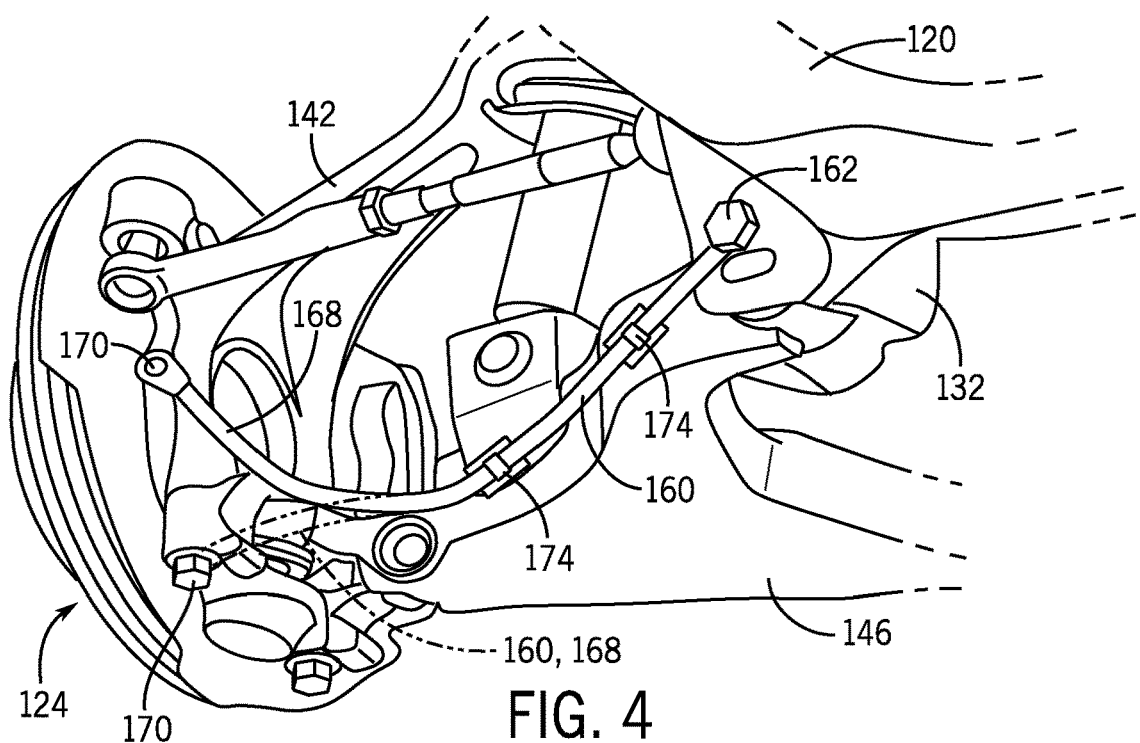
FIG. 4 is a fragmentary perspective view of the vehicle of FIG. 1 and showing the system attached to the vehicle's front wheel assembly at optional locations, according to one or more embodiments of the present disclosure.

FIG. 4 is a fragmentary perspective view of the vehicle 100 and showing the retaining member 160 attached to the front wheel assembly 124, according to one or more embodiments of the present disclosure. As shown in FIG. 4, the retaining member 160 may include a second attachment point 170 connecting the retaining member 160 to the front wheel assembly 124. The second end 168 of the retaining member 160 may be connected to the front wheel assembly 124 with a second connection, such as at the second attachment point 170.

The second attachment point 170 may connect the retaining member 160 to any suitable portion of the front wheel assembly 124. For instance, the second attachment point 170 may connect the retaining member 160 to the steering knuckle 142, such as via a bolted connection, a loop and grommet type connection, or the like. FIG. 4 illustrates optional locations of the second attachment point 170 to the steering knuckle 142. The second attachment point 170 may be selected to control motion of the front wheel assembly 124 during a collision. For instance, the second attachment point 170 may be selected to control a rotation of the front wheel assembly 124 towards the vehicle frame 120 during a collision, such as by controlling a moment created by the retaining member 160 on the front wheel assembly 124. For instance, changing the placement of the second attachment point 170 may define the magnitude and/or direction of the moment created by the retaining member 160 on the front wheel assembly 124. In this manner, the second attachment point 170 may be selected to control the torque action of the retaining member 160 on the front wheel assembly 124 during a collision.

For example, selecting the second attachment point 170 at the rear of the steering knuckle 142 may create a moment or loading inducing a first torque action in the front wheel assembly 124 that increases rotation of the front wheel assembly 124 towards the vehicle frame 120 during a collision. Particularly, a force in the center of the steering knuckle 142 may be created through the drive and/or steering components of the vehicle 100 (e.g., through a ball joint and suspension of the vehicle 100). Another force may be applied to a rear portion or side of the steering knuckle 142 through the retaining member 160. This type of loading may induce a moment inducing the rear of the front wheel assembly 124 to rotate towards the vehicle frame 120.

The second attachment point 170 may be selected at different locations. For instance, selecting the second attachment point 170 at the front of the steering knuckle 142 may create a moment or loading inducing a second torque action in the front wheel assembly 124 that resists rotation of the front wheel assembly 124 during a collision. Specifically, a force in the center of the steering knuckle 142 may be created through the ball joint and suspension of the vehicle 100. Another force may be applied to a front portion or side of the steering knuckle 142 through the retaining member 160. This type of loading may induce a moment resisting rotation of the front of the front wheel assembly 124 away from the vehicle frame 120. In this manner, the second attachment point 170 may be selected to achieve a desired rotation of the front wheel assembly 124 during a collision.

Referring to FIGS. 2-4, the retaining member 160 may include one or more break-away connections 174 attaching the retaining member 160 to the vehicle frame 120 and/or to the front wheel assembly 124. As shown, the break-away connections 174 may be positioned along the length of the retaining member 160 between the first attachment point 162 and the second attachment point 170. The break-away connections 174 may connect the retaining member 160 to the vehicle frame 120 and/or the front wheel assembly 124 to limit interference or contact of the retaining member 160 with moving parts and/or limit snagging of the retaining member 160 with passing objects or debris, such as by taking up any slack in the retaining member 160.

In some embodiments, the break-away connections 174 may control motion of the front wheel assembly 124 during a collision. For example, the break-away connections 174 may be selected such that the break-away connections 174 fail at a predetermined force threshold. In such embodiments, the break-away connections 174 may resist deformation of the front wheel assembly 124 and/or lengthening of the retaining member 160 until the predetermined force threshold is reached, at which point the break-away connections 174 will fail. Depending on the application, the break-away connections 174 may fail all at the same time, at substantially the same time, or in a sequential or other designed manner. For instance, a first one or set of break-away connections 174 may fail at a first force threshold, a second one or set of break-away connections 174 may fail at a second force threshold, and so on. In this manner, resistance provided by the break-away connections 174 may be tailored or tuned to control motion of the front wheel assembly 124 during a collision.

In some embodiments, the break-away connections 174 may be selected to control motion of the front wheel assembly 124 during a collision. For instance, like the first attachment point 162, selecting the break-away connections 174 may control an arc motion of the front wheel assembly 124 during a collision. For example, the break-away connections 174 may effectively "shorten" the retaining member 160 in relation to the second attachment point 170. Specifically, prior to failure of the break-away connections 174, the effective length of the retaining member 160 may be shorter, causing a shorter arc motion of the front wheel assembly 124 prior to break-away connection failure. Once the break-away connections 174 fail, the effective length of the retaining member 160 may increase, thereby causing a longer arc motion of the front wheel assembly 124 after failure of the break-away connections 174. In this manner, the break-away connections 174 may tailor or modify the arc motion of the front wheel assembly 124. For example, the break-away connections 174 may flatten the arc motion of front wheel assembly 124, though other configurations are contemplated.

Figure 5:
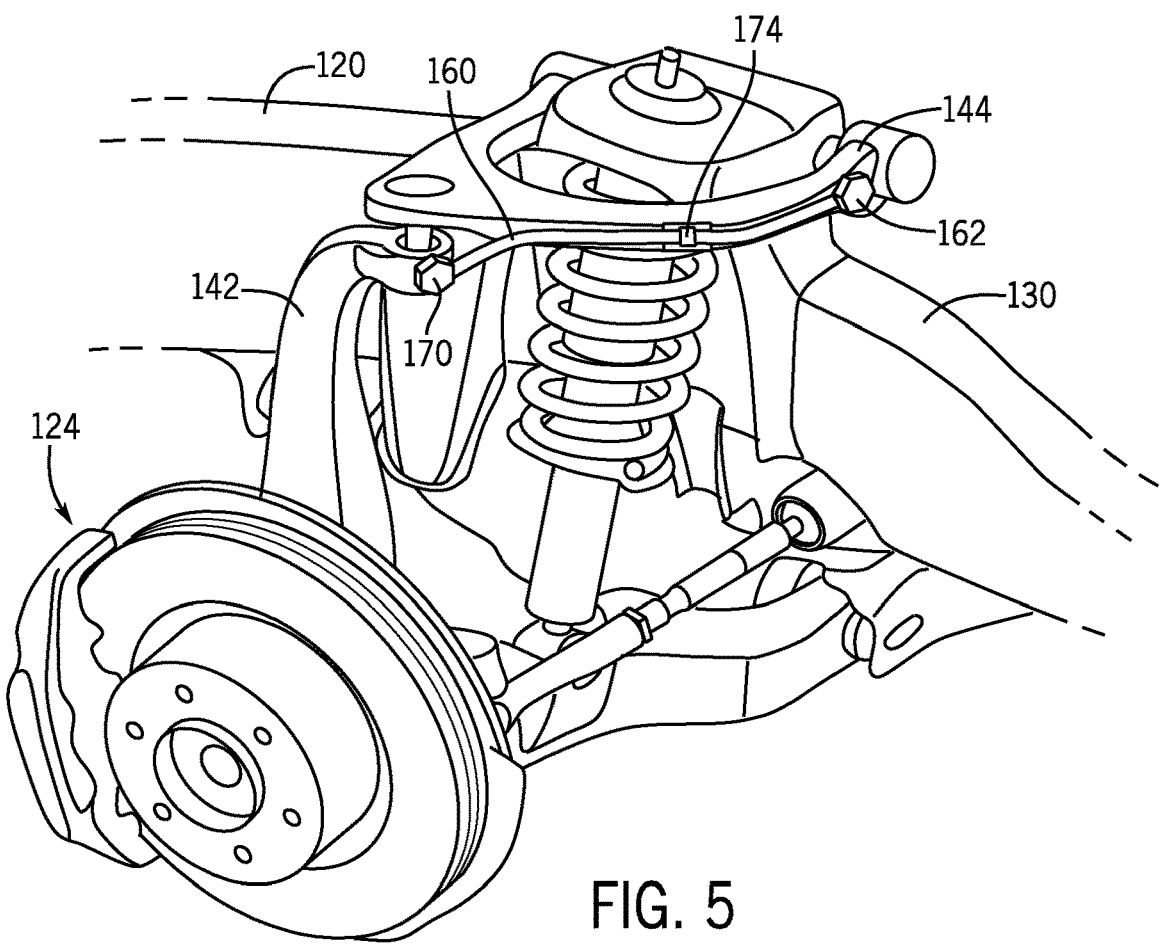
FIG. 5 is a fragmentary perspective view of the vehicle of FIG. 1 and showing an additional routing of the system, according to one or more embodiments of the present disclosure.

FIG. 5 is a fragmentary perspective view of the vehicle 100 and showing an additional routing of the system 102, according to one or more embodiments of the present disclosure. Referring to FIGS. 2-5, the retaining member routing may be selected to control motion of the front wheel assembly 124 during a collision. For example, as shown in FIGS. 2-4, the retaining member 160 may be routed between the vehicle frame 120 and the front wheel assembly 124 along the lower control arm 146. As shown in FIG. 5, the retaining member 160 may be routed between the vehicle frame 120 and the front wheel assembly 124 along the upper control arm 144. The retaining member routing may be selected to control motion of the front wheel assembly 124, such as during a collision. For instance, the retaining member routing may be selected to facilitate suspension motion. For example, the retaining member 160 may be routed along either the lower control arm 146 or the upper control arm 144 in a manner that allows free movement of the associated control arm without binding of the retaining member 160 during normal suspension motion.

In some embodiments, the retaining member routing may be selected to control upward and/or downward motion of the front wheel assembly 124 during a collision. For example, the retaining member routing may be selected to control upward and/or downward motion of the front wheel assembly 124 towards or away from a desired portion of the vehicle frame 120 during a collision. Routing the retaining member 160 along the lower control arm 146, such as that shown in FIGS. 2 and 3, may create a loading inducing motion of the front wheel assembly 124 towards the lower control arm 146. Such embodiments may restrict upward motion of the front wheel assembly 124 during a collision. Routing the retaining member 160 along the upper control arm 144, such as that shown in FIG. 5, may create a loading inducing motion of the front wheel assembly 124 towards the upper control arm 146. Such embodiments may restrict downward motion of the front wheel assembly 124 during a collision.

In some embodiments, the retaining member routing may be selected to control loading of the front wheel assembly 124 and/or the retaining member 160 during a collision. For instance, the retaining member 160 may be routed from the steering knuckle 142 to a point forward of the steering knuckle 142, such as to a point on the vehicle frame 120, on the upper control arm 144, or on the lower control arm 146, to load the retaining member 160 directly by the object 104. For instance, during a collision with the object 104, the object 104 may contact the retaining member 160 directly along a portion of its length. In such embodiments, the object 104 may press against the retaining member 160, thus creating a loading condition from the contact point of the object 104 with the retaining member 160 to the point(s) at which the retaining member 160 is attached.

Accordingly, motion of the front wheel assembly 124 may be controlled by one or more combinations of controlling the first attachment point 162, the second attachment point 170, the break-away connections 174, and/or the retaining member routing. In this manner, motion of the front wheel assembly 124 in response to impact with a colliding object 104 may be tuned by controlling, for example, location(s) on the vehicle frame 120 to which the retaining member 160 is attached, location(s) on the wheel assembly to which the retaining member 160 is attached, and/or the retaining member routing. The motion of the front wheel assembly 124 during a collision may also be tuned by controlling the strength and/or flexibility of the retaining member 160. For instance, a flexible retaining member 160 may allow the retaining member 160 to stretch or deform, further defining the motion of the front wheel assembly 124 during a collision.

Figure 6:
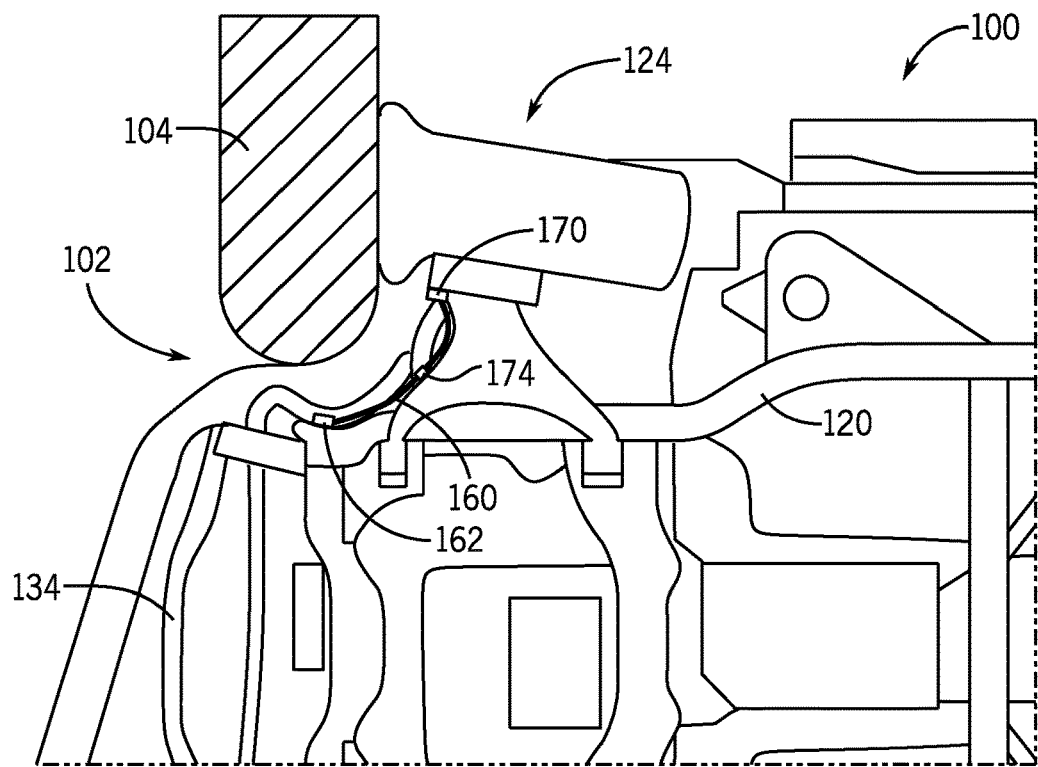
FIG. 6 is a fragmentary bottom view of the vehicle of FIG. 1 and showing the system in a first position or configuration after initial contact of a vehicle with an object, according to one or more embodiments of the present disclosure.

FIGS. 6-9 illustrate the system 102 controlling motion of the front wheel assembly 124 during collision of the vehicle 100 with object 104 (e.g., a barrier), according to one or more embodiments of the present disclosure. FIG. 6 is a fragmentary bottom view of the vehicle 100 and showing the system 102 in a first position or configuration after initial contact of the vehicle 100 with the object 104, according to one or more embodiments of the present disclosure. Upon initial contact of the vehicle 100 with the object 104, portions of the vehicle 100 impinging the object 104 may deform. For example, portions of the front corner of the vehicle 100 may deform when the object 104 overlaps with less than the width of the vehicle 100. As shown, the front bumper 134 and other portions of the front corner of the vehicle 100 may deform until the front wheel assembly 124 contacts the object 104. Depending on the severity of the collision, the front wheel assembly 124 may begin to deform, such as the tire compressing and/or the front wheel assembly 124 moving rearwardly. In some embodiments, initial contact of the front wheel assembly 124 with the object 104 may cause the front wheel assembly 124 to rotate (e.g., clockwise in FIG. 6) towards the vehicle frame 120. In the first position or configuration shown in FIG. 6, the system 102 may still be in a pre-collision configuration or otherwise intact. For instance, the retaining member 160 may have its original length, routing, and/or attachments to the vehicle frame 120 intact.

Figure 7:
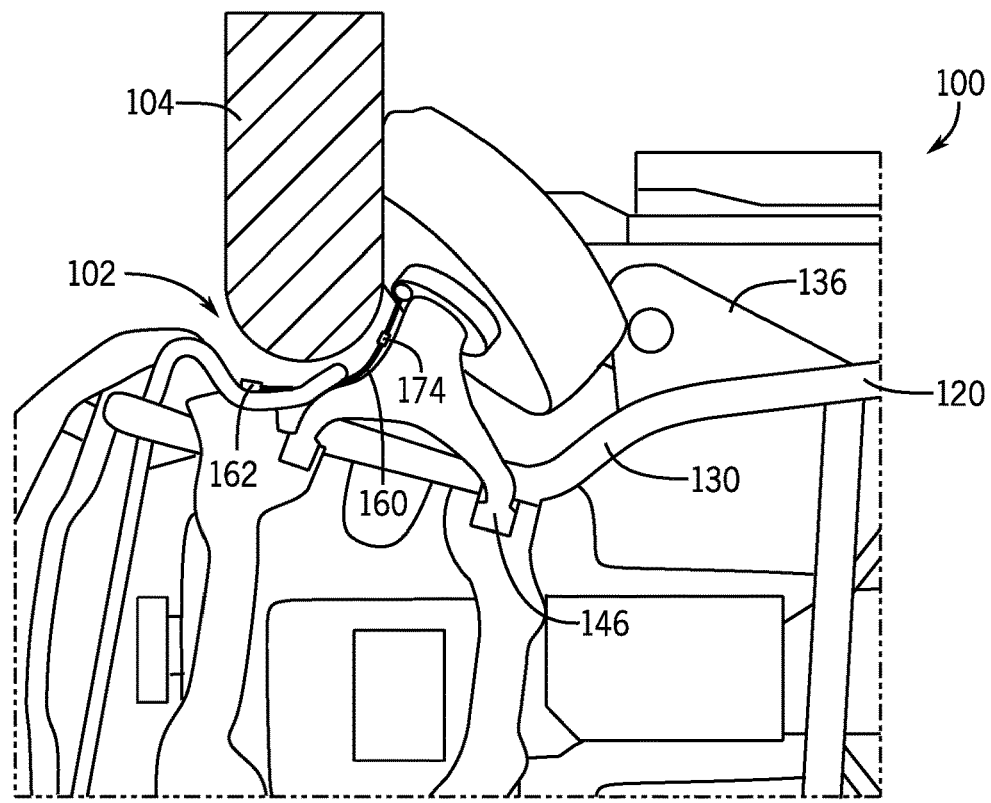
FIG. 7 is a fragmentary bottom of the vehicle of FIG. 1 and showing the system in a second position or configuration following contact of the vehicle with the object, according to one or more embodiments of the present disclosure.

FIG. 7 is a fragmentary bottom view of the vehicle 100 and showing the system 102 in a second position or configuration following contact of the vehicle 100 with the object 104, according to one or more embodiments of the present disclosure. As shown in FIG. 7, the front corner of the vehicle 100 may continue to deform during a partial overlap collision of the vehicle 100 with the object 104. Continued deformation of the vehicle's front corner may cause the front wheel assembly 124 to rotate further towards the vehicle frame 120. Rotation of the front wheel assembly 124 towards the vehicle frame 120 may bend the structural member 130 at or near the attachment point of the lower control arm 146 with the vehicle frame 120. In some embodiments, rotation of the front wheel assembly 124 towards the vehicle frame 120 may cause chassis part fracture, such as fracture of the front wheel assembly 124 (e.g., lower control arm 146 and/or upper control arm 144) from the vehicle frame 120, fracture of the steering knuckle 142 from the upper control arm 144 and/or the lower control arm 146, or the like. In such embodiments, the retaining member 160 may limit ejection or escape of the front wheel assembly 124 from the vehicle 100 due to a break in the connection(s) between the front wheel assembly 124 and the vehicle frame 120. As shown in FIG. 7, rotation of the front wheel assembly 124 towards the vehicle frame 120 as controlled by the retaining member 160 may cause the front wheel assembly 124 to contact the vehicle frame 120, such as the outrigger 136 and/or structural member 130 of the vehicle frame 120.

Figure 8:
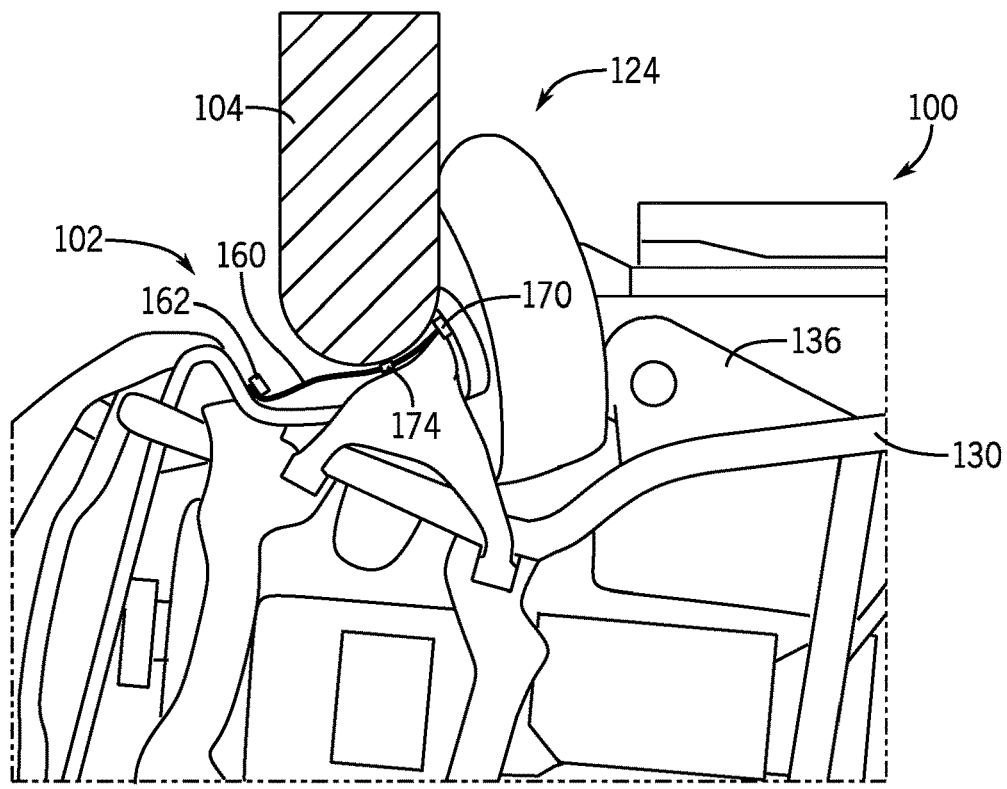
FIG. 8 is a fragmentary bottom view of the vehicle of FIG. 1 and showing the system in a third position or configuration following contact of the vehicle with the other object, according to one or more embodiments of the present disclosure.

FIG. 8 is a fragmentary bottom view of the vehicle 100 and showing the system 102 in a third position or configuration following contact of the vehicle 100 with the object 104, according to one or more embodiments of the present disclosure. As shown in FIG. 8, the front corner of the vehicle 100 may further deform during a partial overlap collision of the vehicle 100 with the object 104, such as causing the front wheel assembly 124 to rotate further towards the vehicle frame 120, further bending the vehicle frame 120 and/or causing additional chassis part fracture. As shown in FIG. 8, further rotation of the front wheel assembly 124 may cause the retaining member 160 to lengthen and/or straighten. For instance, one or more of the break-away connections 174 may fail as the second attachment point 170 of the retaining member 160 to the steering knuckle 142 moves further away from the first attachment point 162 of the retaining member 160 to the vehicle frame 120 to lengthen the retaining member 160. Movement of the second attachment point 170 away from the first attachment point 162 may also straighten the retaining member 160 along its length. In such embodiments, the break-away connections 174 may resist the lengthening and/or straightening of the retaining member 160, thereby resisting deformation of the front wheel assembly 124 and controlling motion of the front wheel assembly 124 during a collision.

Figure 9:
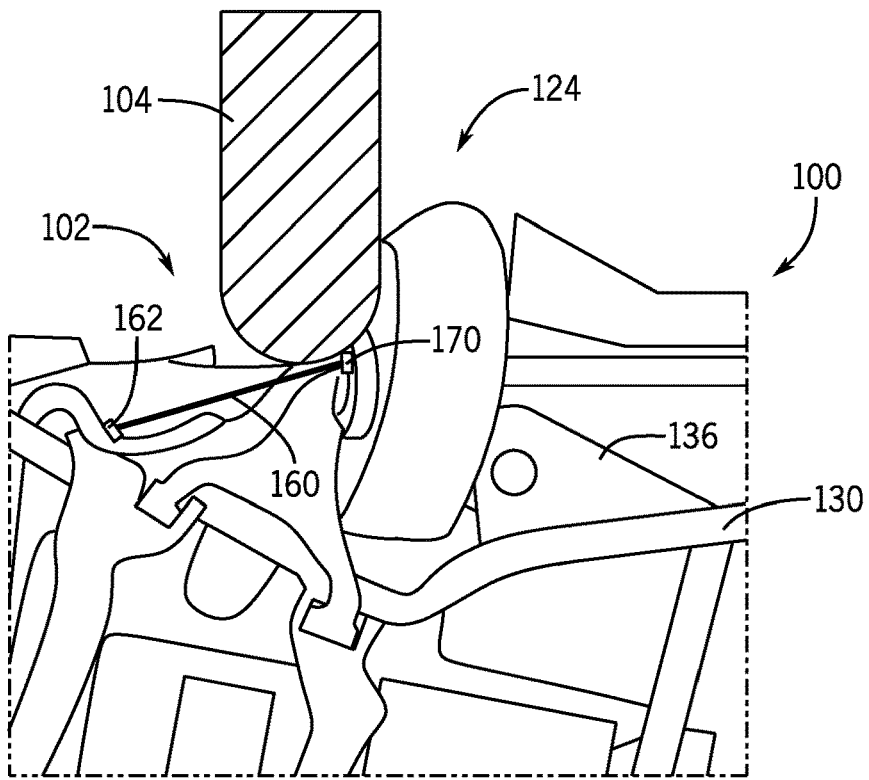
FIG. 9 is a fragmentary bottom view of the vehicle of FIG. 1 and showing the system in a fourth position or configuration following contact of the vehicle with the object, according to one or more embodiments of the present disclosure.

FIG. 9 is a fragmentary bottom view of the vehicle 100 and showing the system 102 in a fourth position or configuration following contact of the vehicle 100 with the object 104, according to one or more embodiments of the present disclosure. As shown in FIG. 9, the front corner of the vehicle 100 may further deform during a partial overlap collision of the vehicle 100 with the object 104, such as causing the front wheel assembly 124 to rotate further towards the vehicle frame 120, further bending the vehicle frame 120 and/or causing additional chassis part fracture. As shown in FIG. 9, the retaining member 160 may be taught as the retaining member 160 is fully lengthened and/or straightened. In such configurations, all or nearly all of the break-away connections 174 may fail as the retaining member 160 is fully lengthened and/or straightened. The retaining member 160 may create a load path tending to rotate the vehicle 100 about the object 104 during the collision. For instance, in the configuration of FIG. 9, the front wheel assembly 124 may be locked behind the object 104, with the retaining member 160 connected to the vehicle frame 120 in front of the object 104. In such embodiments, impact forces from the collision may be directed to the front portion of the vehicle frame 120 through the retaining member 160 to rotate the vehicle 100 about the object 104 during the collision.

Referring to FIGS. 6-9, the retaining member 160 may force or otherwise direct the front wheel assembly 124 into a preferred path during the collision. For example, as shown sequentially in FIGS. 6-9, the retaining member 160 may force or otherwise direct the front wheel assembly 124 into contact with the vehicle frame 120, such as into contact with the structural member 130 and/or an outrigger 136. Specifically, as explained above, the retaining member's routing and length and the attachments of the retaining member 160 to the vehicle frame 120 and/or to the steering knuckle 142 may limit movement of the front wheel assembly 124 within a preferred path during a collision. For example, the retaining member 160 may limit movement of the front wheel assembly 124 within an arc, such as a horizontal arc relative to the ground, towards the vehicle frame 120.

The retaining member 160 may direct the front wheel assembly 124 into contact with the vehicle frame 120 to transfer an impact force from the object 104 to the vehicle frame 120 through the front wheel assembly 124. For instance, rotation of the front wheel assembly 124 into the vehicle frame 120 may transfer an impact force from the object 104 to the vehicle frame 120 through the front wheel assembly 124. In such embodiments, contact of the front wheel assembly 124 with the vehicle frame 120 may load or direct impact forces into the vehicle 100 frame to push the vehicle 100 off or away from the object 104. In this manner, lateral motion of the vehicle 100 away from the object 104 may be maximized. Additionally, or alternatively, this motion of the front wheel assembly 124 as controlled by the retaining member 160 may absorb a first impact energy resulting from the collision of the vehicle 100 with the object 104.

As the retaining member 160 becomes taught and transfers impact forces to the front portion of the vehicle frame 120 (see FIG. 9), the retaining member 160 may absorb a second impact energy resulting from the collision of the vehicle 100 with the object 104. For example, impact energy not transferred to the vehicle frame 120 through the front wheel assembly 124 may be transferred to the vehicle frame 120 through the retaining member 160 in a tensioned state. As described above, the retaining member 160 may also stretch or deform to absorb impact energy.

Figure 10:
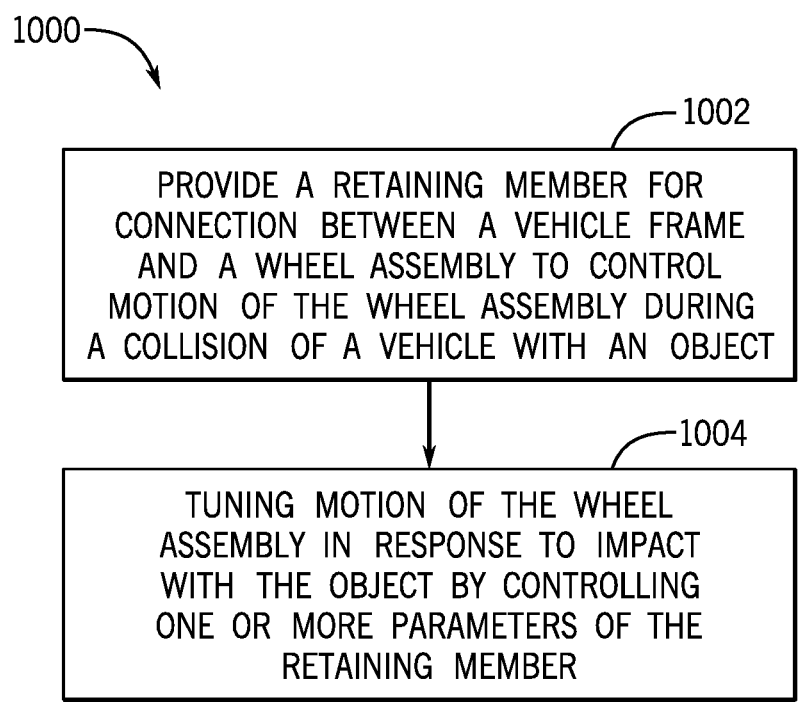
FIG. 10 is a flowchart of a method for controlling wheel motion during a collision, according to one or more embodiments of the present disclosure.

FIG. 10 is a flowchart of a method 1000 for controlling wheel motion during a collision, according to one or more embodiments of the present disclosure. Method 1000 is illustrated as a set of operations or steps and is described with reference to FIGS. 1-9. One or more steps that are not expressly illustrated in FIG. 10 may be included before, after, in between, or as part of the illustrated steps. In one or more embodiments, the steps of method 1000 may be performed to control motion of a front wheel assembly via a retaining member during a collision of a vehicle with an object.

In block 1002, the method 1000 includes providing a retaining member for connection between a vehicle frame and a wheel assembly to control motion of the wheel assembly during a collision of a vehicle with an object. For instance, retaining member 160 may be provided for connection between the vehicle frame 120 and front wheel assembly 124 of FIGS. 1-9, described above. Block 1002 may include securing a first end of the retaining member to the vehicle frame. For instance, retaining member 160 may be connected to the vehicle frame 120 at first attachment point 162 of FIGS. 1-9, described above. Block 1002 may include securing a second end of the retaining member to a steering knuckle of the wheel assembly. For instance, retaining member 160 may be connected to the steering knuckle 142 at second attachment point 170 of FIGS. 1-9, described above.

In block 1004, the method 1000 includes tuning motion of the wheel assembly in response to impact with the object by controlling one or more parameters of the retaining member. Block 1004 may include selecting a first attachment point connecting the retaining member to the vehicle frame to control an arc motion of the wheel assembly towards the vehicle frame. For instance, first attachment point 162 may be selected to define different arcs of travel of the front wheel assembly 124 of FIGS. 1-9, described above, such as defining longer or shorter arcs of motion depending on the application. Block 1004 may include selecting a second attachment point connecting the retaining member to the wheel assembly to control a rotation of the wheel assembly towards the vehicle frame. For example, second attachment point 170 may be selected to define a rotation of the front wheel assembly 124 towards the vehicle frame 120 of FIGS. 1-9, described above, such as increasing or resisting rotation of the front wheel assembly 124 towards the vehicle frame 120. Block 1004 may include selecting one or more break-away connections attaching the retaining member to the vehicle frame and/or to the wheel assembly to modify the arc motion of the wheel assembly towards the vehicle frame. For instance, break-away connections 174 may be selected to modify the arc motion of the front wheel assembly 124 towards the vehicle frame 120 of FIGS. 1-9, described above. In some embodiments, block 1004 may include selecting a retaining member routing to control upward and/or downward motion of the wheel assembly towards a portion of the vehicle frame. For example, the retaining member 160 may be routed along either the lower control arm 146 or the upper control arm 144 of FIGS. 1-9, described above, to create a loading inducing motion of the front wheel assembly 124 towards the lower control arm 146 or the upper control arm 144.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

For example, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments. In addition, while different steps, processes, and procedures are described as appearing as distinct acts, one or more of the steps, one or more of the processes, and/or one or more of the procedures may also be performed in different orders, simultaneously, and/or sequentially. In some embodiments, the steps, processes, and/or procedures may be merged into one or more steps, processes, and/or procedures. In some embodiments, one or more of the operational steps in each embodiment may be omitted.

What is claimed is:

1. A system for controlling wheel motion during a collision, the system comprising:
 a retaining member connectable between a vehicle frame and a wheel assembly to control motion of the wheel assembly during a collision of a vehicle with an object, wherein the retaining member forces the wheel assembly into a preferred path during the collision,
 wherein the retaining member includes one or more of:
  a first attachment point for connecting the retaining member to the vehicle frame, the first attachment point being selected to control motion of the wheel assembly during the collision by controlling an arc motion of the wheel assembly towards the vehicle frame;
  a second attachment point for connecting the retaining member to the wheel assembly, the second attachment point being selected to control motion of the wheel assembly during the collision by controlling a rotation of the wheel assembly towards the vehicle frame; and
  one or more break-away connections for attaching the retaining member to the vehicle frame and/or to the wheel assembly, the one or more break-away connections being selected to control motion of the wheel assembly during the collision by modifying the arc motion of the wheel assembly towards the vehicle frame.

2. The system of claim 1, wherein the retaining member forces the wheel into contact with the vehicle frame to transfer an impact force from the object to the vehicle frame through the wheel.

3. The system of claim 2, wherein the retaining member creates a load path tending to rotate the vehicle about the object during the collision.

4. The system of claim 2, wherein the preferred path maximizes lateral motion of the vehicle away from the object.

5. The system of claim 1, wherein the retaining member is connectable between the vehicle frame and a steering knuckle of the wheel assembly.

6. The system of claim 1, wherein the retaining member is selected from the group consisting of a tether and a cable.

7. The system of claim 1, wherein the retaining member limits movement of the wheel assembly during the collision within a horizontal arc relative to the ground.

8. The system of claim 1, wherein the retaining member includes a retaining member routing, the retaining member routing being selected to control motion of the wheel assembly during the collision by controlling upward and/or downward motion of the wheel assembly towards a portion of the vehicle frame.

9. A system for controlling wheel motion during a collision, the system comprising:
a vehicle frame;
a wheel assembly; and
a retaining member connected between the vehicle frame and the wheel assembly to control motion of the wheel during a collision with an object, wherein the retaining member forces the wheel assembly into a preferred path during the collision;
wherein the retaining member includes one or more of:
a first attachment point connecting the retaining member to the vehicle frame, the first attachment point being selected to control motion of the wheel assembly during the collision by controlling an arc motion of the wheel assembly towards the vehicle frame;
a second attachment point connecting the retaining member to the wheel assembly, the second attachment point being selected to control motion of the wheel assembly during the collision by controlling a rotation of the wheel assembly towards the vehicle frame; and
one or more break-away connections attaching the retaining member to the vehicle frame and/or to the wheel assembly, the one or more break-away connections being selected to control motion of the wheel assembly during the collision by modifying the arc motion of the wheel assembly towards the vehicle frame.

10. The system of claim 9, wherein the retaining member includes a retaining member routing, the retaining member routing being selected to control motion of the wheel assembly during the collision by controlling upward and/or downward motion of the wheel assembly towards a portion of the vehicle frame.

11. The system of claim 10, wherein the retaining member absorbs a first impact energy resulting from the collision of the vehicle with the object.

12. The system of claim 11, wherein motion of the wheel controlled by the retaining member absorbs a second impact energy resulting from the collision of the vehicle with the object.

13. The system of claim 9, wherein:
the wheel assembly comprises a steering knuckle; and
the retaining member is connected between the vehicle frame at the first attachment point and the steering knuckle at the second attachment point.

14. The system of claim 13, wherein:
a first end of the retaining member is connected to the vehicle frame at the first attachment point with a first connection; and
a second end of the retaining member is connected to the steering knuckle at the second attachment point with a second connection.

15. The system of claim 14, wherein at least one of the first connection and the second connection is a bolted connection.

16. The system of claim 14, wherein the first end of the retaining member is connected to a portion of the vehicle frame forward of the steering knuckle.

17. A method for controlling wheel motion during a collision, the method comprising:
providing a retaining member for connection between a vehicle frame and a wheel assembly to control motion of the wheel assembly during a collision of a vehicle with an object; and
tuning motion of the wheel assembly in response to impact with the object by controlling one or more parameters of the retaining member to force the wheel assembly into a preferred path during the collision, wherein tuning motion of the wheel assembly comprises:
selecting a first attachment point connecting the retaining member to the vehicle frame to control an arc motion of the wheel assembly towards the vehicle frame;
selecting a second attachment point connecting the retaining member to the wheel assembly to control a rotation of the wheel assembly towards the vehicle frame; and
selecting one or more break-away connections attaching the retaining member to the vehicle frame and/or to the wheel assembly to modify the arc motion of the wheel assembly towards the vehicle frame.

18. The method of claim 17, wherein providing the retaining member between the vehicle frame and the wheel assembly comprises:
securing a first end of the retaining member to the vehicle frame at the first attachment point; and
securing a second end of the retaining member to a steering knuckle of the wheel assembly at the second attachment point.

19. The method of claim 17, wherein the retaining member forces the wheel assembly into contact with the vehicle frame to transfer an impact force from the object to the vehicle frame through the wheel assembly.

20. The method of claim 17, wherein tuning motion of the wheel assembly further comprises selecting a retaining member routing to control upward and/or downward motion of the wheel assembly towards a portion of the vehicle frame.

* * * * *